W. SCOTT.
COUPLING DEVICE.
APPLICATION FILED DEC. 14, 1918.
1,312,584.
Patented Aug. 12, 1919.
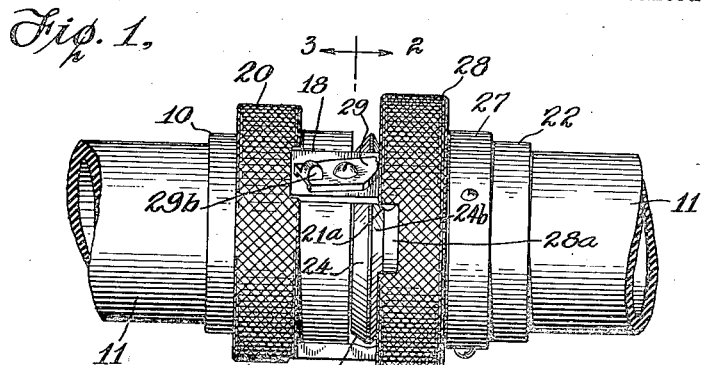
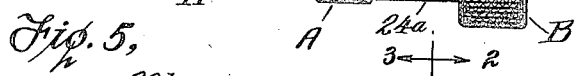
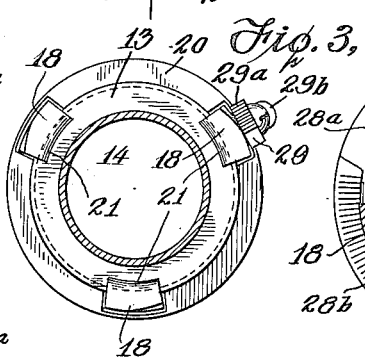
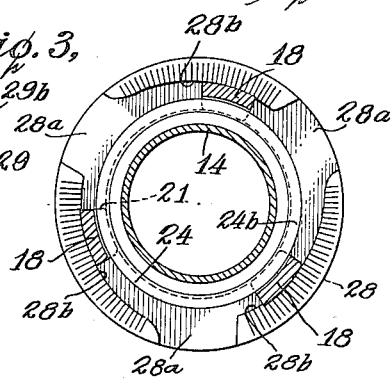
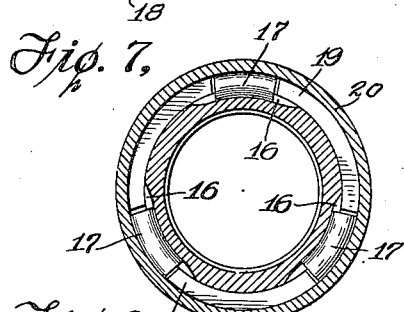
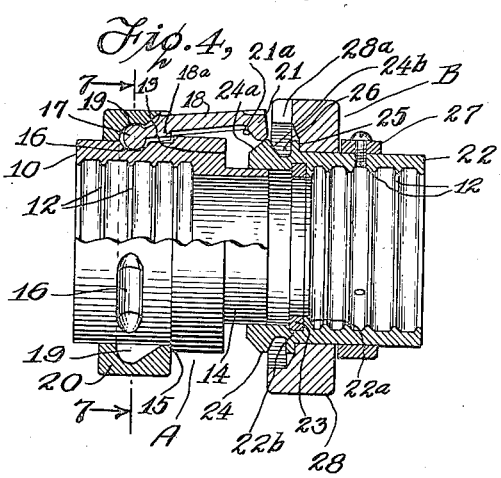
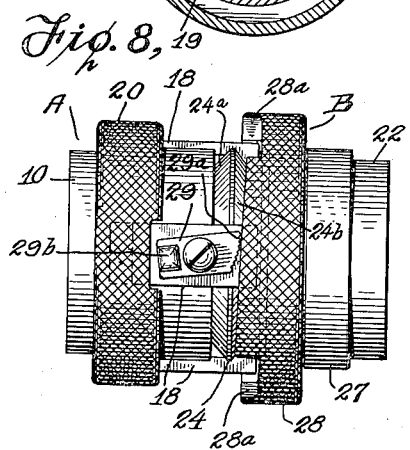
Inventor
Walter Scott
By his Attorneys
Meyers, Cushman & Rea

UNITED STATES PATENT OFFICE.

WALTER SCOTT, OF SHERIDAN, WYOMING.

COUPLING DEVICE.

1,312,584. Specification of Letters Patent. Patented Aug. 12, 1919.

Application filed December 14, 1918. Serial No. 266,727.

*To all whom it may concern:*

Be it known that I, WALTER SCOTT, a citizen of the United States, residing at Sheridan, in the county of Sheridan and State of Wyoming, have invented new and useful Improvements in Coupling Devices, of which the following is a specification.

This invention relates to improvements in coupling devices, pertaining more particularly to structures of this type adapted for use under quick attaching and detaching conditions—examplified, for instance, by devices of this type for coupling hose sections.

Various forms of devices of this type have been contemplated and some of them placed in service, but these are more or less complicated in structure or in operation, and, owing to service conditions generally, have been found more or less inefficient unless of such complicated character.

One form of such devices contemplates the use of threaded connections—either by continuous or mutilated threads—the purpose being to draw the mating elements together in the direction of the assembly axis by the threading action. Such structures not only require accuracy in alining the complemental threads at the beginning of assembly, but also are subject to the effects of pulling strains when dragging the coupled hose sections about.

Attempts have been made to eliminate these difficulties by assembly without rotation and by the use of projecting members carried by one element movable over a ridge or annular projection of the opposite member, but this particular type is objectionable in that the projecting members are exposed when in position—subject to distortion or straining during such dragging action—in addition to which there is a requirement that means be provided for maintaining the members in locked position, so that separation does not readily result from pulling strains.

The present invention is designed to overcome these and other difficulties by eliminating the threading action and the requirements of accurate adjustment, and at the same time employ a rotatable action operative to practically house the locking portions of the projecting members, enabling quick assembly and detachment, and at the same time protect the members against service difficulties.

In addition, the invention contemplates the use of a true male and female relation in such manner as to render the presence of a gasket structure simply an aid in leakage-preventing, permitting the use of a simple and inexpensive form of gasket, readily renewed, or, in some cases, if desired, permitting omission of such structure.

Other features are the ability to assemble or detach without requiring relative rotation or accurate positioning of the body portions of the mating elements, thus eliminating strains on the particular connection of hose with its coupling element; to provide a firm grip of the holding elements in assembly, this being provided in such manner as to permit the use of a simple structure to automatically secure and maintain the parts in such position, and yet permit quick detachment by manual manipulation at will; and to practically eliminate the possibility of bending or distorting the parts while the coupling is in service.

In addition, the invention has for its objects the construction of a coupling which is simple and efficient in operation, durable in construction and of comparatively few parts, each of a more or less rugged character, and which can be manufactured at a comparatively low cost.

To these and other ends, the nature of which will be readily understood, said invention consists in the improved construction and combination of parts, hereinafter fully described, illustrated in the accompanying drawings and more particularly pointed out in the appended claims.

In the accompanying drawings, in which similar reference characters indicate similar parts in each of the views,—

Figure 1 is a side elevation of an assembled coupling embodying the general principles of the present invention.

Figs. 2 and 3 are sectional views taken approximately on the indicated lines of Fig. 1, the respective viewpoints being indicated by the arrows 2, 3.

Fig. 4 is a view partly in elevation and partly in longitudinal section, the view showing an intermediate position of the assembly operation.

Fig. 5 is a detail view of one of the projecting or locking members, showing a holding device partly in elevation and partly in section.

Fig. 6 is a horizontal section of the structure of Fig. 5, parts being shown in dotted lines.

Fig. 7 is a sectional view taken on line 7—7 of Fig. 4.

Fig. 8 is a view in elevation of a modified form.

In the drawings, A and B indicate the two mating elements of the coupling, these elements having a male and female relationship, element A, for illustrative purposes, being shown as the male element. In the particular form illustrated, element A is shown as carrying the projecting elements, element B carrying the complemental structure, it being understood, however, that this is illustrative only, it being obvious that this arrangement may be reversed.

Referring to element A, 10 indicates the body portion of tubular form, the interior being shown as of two diameters, that at the rear being increased to receive the hose section 11, this portion of the interior preferably having a suitable configuration—shown as in the form of ribs 12—for holding the section in position. The advance portion of the interior is of the desired diameter of the stream which may flow through the coupling.

The exterior body portion 10 is provided with a shoulder 13 spaced from the advance end of the element, thus providing a portion 14 of reduced diameter and which forms the male member of the coupling, the axial length of this portion being as desired or found necessary.

At suitable points circumferentially of body portion 10 in rear of shoulder 13 and in rear of a supplemental shoulder 15, if employed, are formed depressions 16 preferably extending transversely of the direction of the axis of the element, these depressions being adapted to receive the pintles 17 of the projecting elements or fingers 18, the depressions forming the inner bearing members for the pintles. The bearing for each pintle is completed by a cavity 19 formed interiorly of a ring-element 20 carried by body portion 10 in rear of shoulder 15, each cavity being open toward the front of the ring for the passage of the shank of element 18 and permit limited swiveling or laterally swinging movement of element 18. If desired, element 18 may carry a shoulder 18ª to rest behind shoulder 15 when element 18 is in its locking position.

The advance end of element 18 is provided with an inwardly extending or locking element, shown as a toe or lip, preferably having its rear face inclined or beveled toward its tip, as at 21ª, for a purpose presently described. Obviously, ring 20 may be secured in any suitable manner.

As will be understood, the particular manner of mounting elements 18 is such as to not only provide an efficient and substantial bearing for the elements, but the structure is such as to withstand the difficulties of service conditions, being such as to provide a strong pintle formation as an integral part of element 18, while the two bearing members are rigid and substantial.

Element B—the female element—has its body portion 22 internally formed to receive the hose section, the advance portion of the body having an internal diameter to receive the male member 14. If desired, a gasket 23 may be located in the path of advance of the male member, as indicated in Fig. 4, the gasket being seated in advance of a shoulder 22ª of the body-portion, and may be seated in an annular channel 22ᵇ, if desired.

As will be understood from Fig. 4, the advance end of element B approaches shoulder 13 as the assembly is being made, and the two parts may be so formed that when the assembly is completed such advance end will be in close proximity to or in contact with shoulder 13, although this is not essential, the length of male member 14 controlling in this respect. It will be seen that male member 14 is of such length as to provide not only an efficient steadying effect to the assembly, but in addition so restricts leakage possibilities—even though the fit may be more or less loose—as to make possible the use of a gasket of simple form and material.

The periphery of the advance end is formed with an annular bead or rib 24 which is preferably continuous about the periphery of the body, said rib preferably having opposite faces 24ª and 24ᵇ inclined or beveled in opposite directions, thus producing a rib structure decreasing in thickness toward its outer diameter. While this beveled construction is preferred, one or both of the faces may be formed otherwise, the particular form shown having the advantage of providing certain actions which increase the rapidity of coupling action. For instance, face 24ª will force the projecting elements or fingers 18 outward as the two mating elements are being assembled to carry lug or lip 21 over bead 24 and bring face 24ª in position to contact with face 24ᵇ, after which inward movement of the lugs will cause faces 21ª and 24ᵇ to operate as cams to draw the elements into assembled relation.

Body portion 22 carries an annular flange 25 in rear of and spaced from face 24ᵇ, thus producing an annular channel 26 between said face and the flange into which the toes 21 pass during the assembly.

Mounted on body portion 22 between flange 25 and a suitable retaining device 27, shown as a ring secured to the body portion, is a ring-like housing or locking element 28, preferably free to rotate on body-portion 22. As shown, element 28 projects over channel 26, such projecting portion being recessed rearwardly as at 28$^a$ at points corresponding to the spacing of fingers 18, thus producing a segmental forwardly projecting flange effect, the inner portions being cut away to provide a space between the plane of an arc formed by the rib 24 and that provided by the inner face of a segment, thus permitting the fingers to be properly positioned beneath the segments in the assemblage. These inner faces of the segments are preferably eccentric to the axis of the element, as shown at 28$^b$ in Fig. 2, thus causing a cam action during relative movement of element 28 and the fingers which may be positioned beneath the segments.

Since element 28 is freely movable rotatively, it will be understood that when male member 14 is entered into element B and advanced, element 28 may be moved pivotally until the recesses 28$^a$ are alined with fingers 18 thus permitting the toes 21—which are moved outwardly by face 24$^a$—to pass into channel 26, whereupon rotative movement of element 28 causes the segments to pass over the toe ends of the fingers and preventing their outward movement. As the rotating movement continues, faces 28$^b$ tend to force toes 21 downward in channel 26 to produce a clamping or gripping effect on the toes, and at the same time faces 21$^a$ and 24$^a$ coöperate in a cam action which serves to provide relative movement between elements A and B in directions to tighten the coupling. For instance, if the assembly action to the point where rotation of element 28 begins carries the advance end of male member 14 into contact with gasket 23, the subsequent clamping action will cause this contact to be changed to a gasket-compressing action, the amount of which tends to control the length of the angular movement of element 28 in an obvious manner.

As will be understood, this assembly is had without manipulating body portion 22 in a rotary direction, the initial entry of the male member not requiring any particular relative location of the locking devices. Such adjustment as may be required is limited to the annular element 28, the movements of which have no effect on body-portion 22, so that no necessity exits for manipulating the hose section rotatively in a manner which might strain its connection with element B. The same is true in uncoupling—an action the reverse of that described—the rotative movement required being confined to the element 28.

While the cam clamping action may be sufficient generally to maintain the parts in locked position, I preferably employ a simple maintaining element in the form of a pivoted element 29 carried by one of the fingers, this element having a cam-face 29$^a$—preferably roughened or serrated—and a finger-piece 29$^b$. As shown in Figs. 5 and 6, I preferably employ a spring 30 to normally hold element 29 in its advance position. With the advance edge of the segments of element 28 roughened, it will be understood that when elements A and B are being moved to assembled position and element 28 begins rotation, face 29$^a$ is brought into contact with a roughened face of element 28, and as said element advances face 29$^a$ will ride over the roughened face, due to the yielding mounting of element 29. Retrograde movement of element 28, however, will cause face 29$^a$ to firmly engage element 28 and prevent rotation to release the fingers unless element 29 is moved pivotally to release the cam action, finger-piece 29$^b$ being useful for the purpose. Since it is necessary only to prevent rotation of element 28, it will be understood that but one of the locking structures need be employed.

If desired, the advance edge of the segments may also be inclined, as in Fig. 8, thus causing face 29$^a$ to ride over a roughened cam face, but this is not essential.

As will be understood, the general arrangement is such as to permit rapid assembly or detachment, and at the same time presenting a structure of relatively few parts, each simple and of generally rugged character, so that the coupling is capable of meeting the conditions of hard service. In addition, uncoupling is entirely dependent on rotative movement of element 28 in a direction unaffected by pulling strains on the connected elements and since coupled sections are seldom rolled laterally such rotative movement under service condition is unlikely. However, the locking device 29 serves to prevent this should any tendency be present. Obviously, the structure is of a form which can be manufactured at a relatively low cost.

As will be understood, the coupling structures of the two elements may be reversed, and it may be possible in some uses, to omit the male and female relation and provide simply the abutting relation, but the latter does not normally have the rigidity of the male and female relation.

While I have herein shown and described a preferred embodiment of the invention, it will be readily understood that changes or modifications therein may be found desirable or essential to meet the exigencies of use, and I desire to be understood as reserving the right to make any and all such changes or modifications as may be found necessary or desirable, in so far as the same may fall within the spirit and scope of the invention as expressed in the accompanying claims, when broadly construed.

What I claim is—

1. A coupling device comprising two mating elements having a male and female relation, one of said elements carrying a plurality of independent laterally-swinging forwardly-projecting members spaced apart, the other of said elements including a member having an external annular groove, and a member overlying said groove and coöperating with said groove to form a channel to receive said pivoted members, said overlying member having an end face recessed in positions corresponding to the positions of the pivoted members, said recesses permitting the latter members to enter the channel and permit seating therein by relative rotative movements of coöperating portions, whereby the engaging portions of the swinging members will be housed.

2. A coupling device comprising two mating elements having a male and female relation, one of said elements carrying a plurality of independent laterally-swinging forwardly-projecting members spaced apart, the other of said elements including a member having an external annular groove, and a member overlying said groove and coöperating with said groove to form a channel to receive said pivoted members, said overlying member having an end face recessed in positions corresponding to the positions of the pivoted members, said recesses permitting the latter members to enter the channel and permit seating therein by relative rotative movements of coöperating portions, whereby the engaging portions of the swinging members will be housed, one of said elements carrying automatic means for engaging the other element to retain the elements against retrograde movement, said means being manually operative to permit such retrograde movement at will.

3. A coupling device comprising two mating elements having a male and female relation, one of said elements carrying a plurality of independent laterally-swinging forwardly-projecting members spaced apart, the other of said elements including a member overlying said groove and coöperating with said groove to form a channel to receive said pivoted members, said overlying member having an end face recessed in positions corresponding to the positions of the pivoted members, said recesses permitting the latter members to enter the channel and permit seating therein by relative rotative movements of coöperating portions, the channel-forming face of the overlying member having a configuration between recesses to effect a cam-action on the pivoted members as the elements are moved to locking position, whereby the engaging portions of the pivoted members will be housed.

4. A coupling device comprising two mating elements having a male and female relation, one of said elements carrying a plurality of independent laterally-swinging forwardly-projecting members spaced apart, the other of said elements including a member having an external annular groove, and a member overlying said groove and coöperating with said groove to form a channel to receive said pivoted members, said overlying member having an end face recessed in positions corresponding to the positions of the pivoted members, said recesses permitting the latter members to enter the channel and permit seating therein by relative rotative movements of coöperating portions, whereby the engaging portions of the swinging members will be housed, one of said elements carrying a swiveled locking element to permit such relative rotative movements, whereby locking and unlocking action may be provided while maintaining the element bodies against rotation.

5. A coupling device comprising two mating elements having a male and female relation, one of said elements carrying a plurality of independent laterally-swinging forwardly-projecting members spaced apart, the other of said elements including a member having an external annular groove, and a member overlying said groove and coöperating with said groove to form a channel to receive said pivoted members, said overlying member having an end face recessed in positions corresponding to the positions of the pivoted members, said recesses permitting the latter members to enter the channel, said overlying member being mounted to swivel on its supporting member to cause locking action of the elements by rotative movement of the overlying member, whereby the engaging portions of the pivoted members are positioned relative to the groove during assembly and are housed by such rotative movement without affecting such position.

6. A coupling device comprising two mating elements having a male and female relation, one of said elements carrying a plurality of independent laterally-swinging forwardly-projecting members spaced apart, the other of said elements including a member having an external annular groove, and a member overlying said groove and coöperating with said groove to form a channel to receive said pivoted members, said overlying member having an end face recessed in positions corresponding to the positions of the pivoted members, said recesses permitting the latter members to enter the channel and permit seating therein by relative rotative movements of coöperating portions, whereby the engaging portions of the swinging members will be housed, one of said pivoted members carrying automatic means for engaging said recessed end face to maintain the elements against retrograde movement, said means being manually operative to release the engagement and permit such movement.

7. A detachable coupling embodying a pair of mating members, one of which is provided with a plurality of laterally swinging fingers and the other of which is provided with retaining means for the ends of the fingers, said retaining means including a member overlying the ends of said fingers when they are in locking relation.

8. A detachable coupling embodying a pair of mating members, one of which is provided with a plurality of laterally swinging fingers and the other of which is provided with retaining means for the ends of the fingers, said retaining means including a rotatable member overlying the ends of said fingers when they are in locking relation.

9. A detachable coupling embodying a pair of mating members, one of which is provided with a plurality of laterally swinging fingers and the other of which is provided with retaining means for the ends of the fingers, said retaining means including a rotatable member overlying the ends of said fingers when they are in locking relation, said member having a configuration to permit concurrent positioning of the fingers.

10. A detachable coupling embodying a pair of mating members, one of which is provided with a plurality of laterally swinging fingers and the other of which is provided with retaining means for the ends of the fingers, said retaining means including a rotatable member overlying the ends of said fingers when they are in locking relation, said member having a configuration to permit concurrent positioning of the fingers, and cause movement of the positioned fingers into a clamped relation.

11. A detachable coupling embodying a pair of mating members, one of which is provided with a plurality of laterally swinging fingers and the other of which is provided with retaining means for the ends of the fingers, said retaining means including a member overlying the ends of said fingers when they are in locking relation, and position-maintaining means for engaging said latter member to retain the locked relation.

12. A detachable coupling comprising a pair of mating members, one of which is provided with a plurality of laterally-swinging fingers and the other of which is provided with an annular rib having faces coöperating with the fingers during assembly to first swing the fingers outwardly and then automatically advance them during finger inward movement, said latter member also carrying a rotatable member movable to overlie the finger ends in locking position.

In testimony whereof I have hereunto set my hand.

WALTER SCOTT.